May 12, 1959 S. F. PATON 2,886,176
MAGNETIC FILTER FOR FUEL SYSTEMS
Filed July 5, 1957

INVENTOR.
Sidney F. Paton
BY Flehr and Swain
Attorneys

United States Patent Office 2,886,176
Patented May 12, 1959

2,886,176

MAGNETIC FILTER FOR FUEL SYSTEMS

Sidney F. Paton, San Francisco, Calif.

Application July 5, 1957, Serial No. 670,012

2 Claims. (Cl. 210—223)

This invention relates to a magnetic fuel separator and particularly to a device of this kind which is adapted to be introduced into the fuel or oil line of an internal combustion engine, particularly of the type used in connection with automotive vehicles.

The service requirements for automotive gasoline strainers or filters have become very critical due to recent carburetor and fuel developments. The new high efficiency and high performance engines require carburetors having extremely fine jets which require the fuel to be more perfectly filtered and strained to prevent clogging of the jets.

A large proportion of the deposits on present day fuel strainers consists of iron and steel particles which block the filtering surface and reduce the efficiency and capacity of the filter. In the event these elements are successfully passed through the filter it is apparent that they will lodge on the internal working parts of the engine where they cause considerable damage and form deposits which decrease the efficiency of the valve mechanism, the firing mechanism, etc.

In order to prevent these particles which are normally found in the fuel supply from becoming imbedded in the filter surface or from passing beyond the filter surface and lodging themselves in the engine with the previously suggested results, I propose to position a magnet within the filter unit to collect these particles before they are deposited on the filter surface.

It is a principal object of this invention to provide an annular magnetic ring adjacent the normal flow of the fuel before the fuel would normally pass through the conventional filter element so as to remove from the fuel as much of the contaminating material as is possible.

Figure 1:
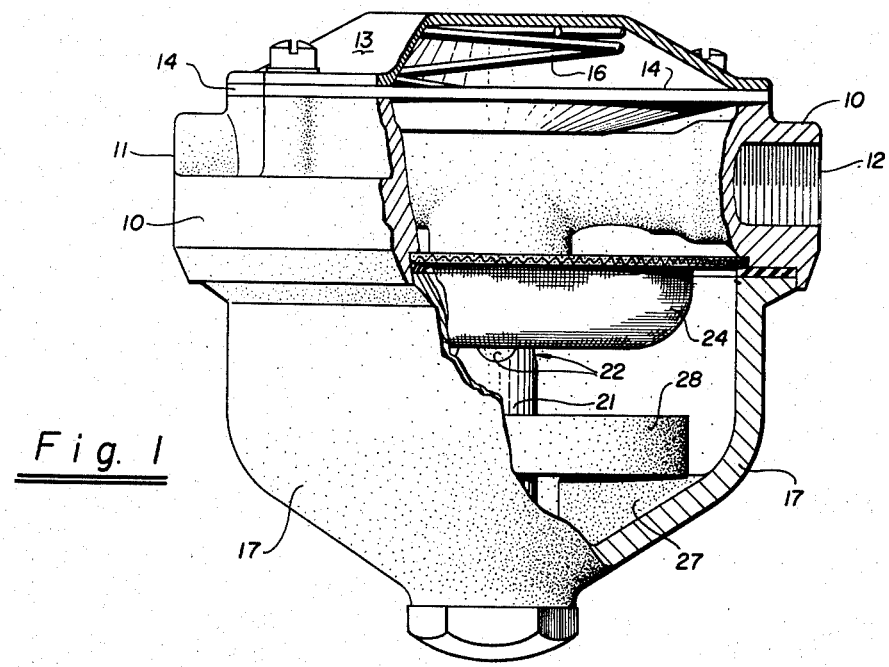
Figure 2:
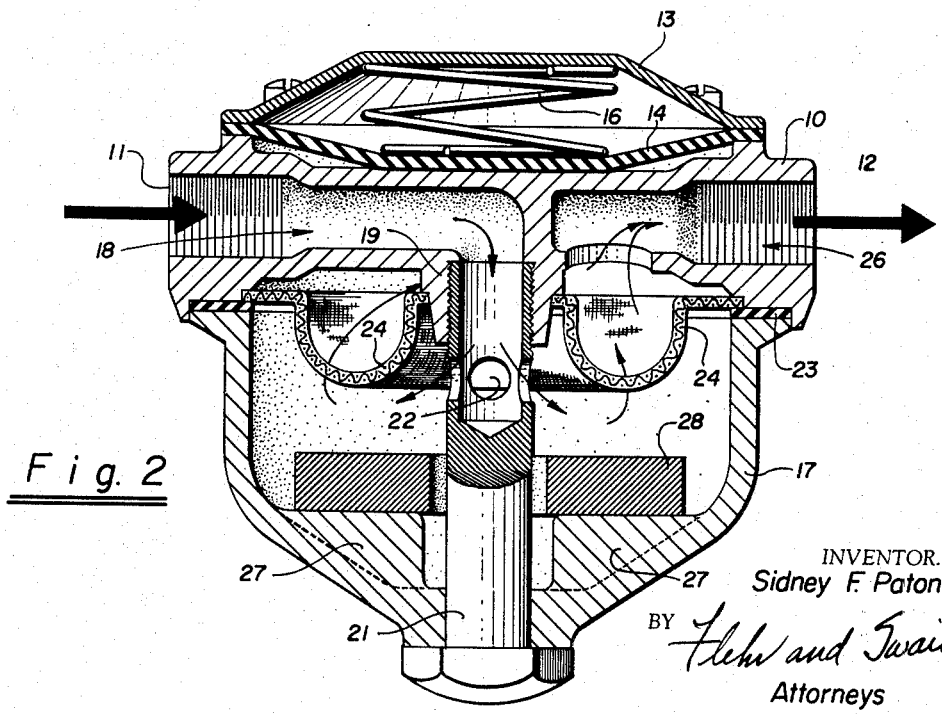

Other objects and advantages of this invention will appear from the following specification taken in conjunction with the accompanying drawing in which:

Figure 1 represents a side elevational view, partially in cross-section, of an improved filter element incorporating a magnetic filter therein, and Figure 2 represents a cross-sectional detail view of the device illustrated in Figure 1 showing the path of the fuel through the device.

The device illustrated is shown particularly in Andrews Patent 2,544,289, granted March 6, 1951, which illustrates a filter and pulsation dampener which is adapted to absorb the pulsations of the fuel in the fuel line and to deliver fuel at a steady rate to the carburetor. This device also provides an excellent housing for the conventional filter or strainer which is adapted to strain or filter substantially all of the contaminants from the fuel which is passed therethrough.

The device illustrated in Figure 2 consists of a body 10 which is provided with threaded inlet 11 and outlet 12 which are adapted to be connected by suitable conduits to the remainder of the fuel system. The body 10 may be cast of any suitable material and is provided at its top with an enlarged opening which is adapted to support a cover 13, a diaphragm 14 and a spring 16 whose purpose is more fully disclosed and claimed in said Patent 2,544,- 289. The area below the diaphragm 14 is in communication with the larger area which is defined by the bowl 17 which is secured to the lower side of the body 10. As indicated particularly in Figure 2 the body 10 is provided with an elongated fuel passageway 18 through which the fuel is introduced into my device. The passageway 18 terminates at about the center of the device 10, in a horizontal plane, and is provided with a downwardly extending tubular portion 19 which is internally threaded and which is adapted to receive a bolt 21. The bolt 21 is drilled out as indicated in the drawing and is provided with orifice 22 in such a manner that fuel may flow through the inlet passageway 18 and through the drilled out bore of the bolt 21 and through the orifice 22 into the enlarged body area provided by the bowl 17. The bowl 17 is separated from the body portion 10 by a gasket 23 and the two portions 10 and 17 are so constructed as to provide a seat which supports a conventional filter element 24. The filter element 24 abuts the exterior wall of the downwardly extending tubular member 19 in such a manner that a fluid-proof seal is provided. Thus any fuel which flows into the bowl 17 will have to pass through the filter 24 before it can pass through the outlet passageway 26 and into the carburetor of the vehicle.

The filter and pulsation dampener thus described is more or less conventional. It is to be understood that the body portion 10 may be formed of any suitable material which can be cast and which can be provided with the necessary threads and passageways. The bowl element 17 may be formed of metal, glass, or suitable plastic so that it may either be opaque, translucent or transparent.

In the particular embodiment illustrated in Figure 2, I have provided a plurality of support members 27 which are adapted to support a magnet 28. The support members 27, as indicated in Figure 2, are cast integrally with the bowl 17 and the upper surfaces are coplaner whereby they support the magnet 28 as indicated. The magnetic element 28 may be of the so-called ceramic magnet type or may be made of any other suitable magnetic material, but it is only necessary, to the proper operation of my device, that the magnetic element 28 be adapted to attract any ferrous particles in the fuel.

Operation of the device may briefly be described as follows: The device is inserted in a conventional fuel line in such a manner that the fuel enters through port 11 and is discharged through the port 12. The fuel flows through the passageway 18, through the bored-out portion of the bolt 21 and the orifice 22 into the zone defined by the bowl 17 and the filter 24. As the fuel is discharged through the ports 22 it tends to swirl throughout this entire zone and will contact or be brought within the range of the magnetic influence of the member 28. All ferrous particles are thereby removed and held by the member 28. The gasoline will then discharge through the filter 24 and the passageway 26 free and clear of these contaminants. Non-ferrous contaminants will of course be retained on the filter 24.

It is apparent that the member 21 may be formed of magnetic material in which event of course the ferrous particles might be attracted by and retained by the member 21 at any point either within the bored-out portion or upon any point on the exterior of the member 21. It is equally apparent that instead of providing support members 27 on the interior surface of the bowl 17, the magnetic element 28 may be provided with legs which would support it and separate it from the bottom of the bowl 17. In another modification it of course might be possible to provide an interior spacer element either in the form of a plastic brace which could be inserted in a conventional bowl and which would support the magnet in a predetermined desired position. However none of these modifications or alterations would depart from the spirit of my invention.

I claim:

1. A filtering device, comprising: a body having fuel inlet and fuel outlet flow passages; a bowl supported by said body; means including a bolt for holding said bowl in position against said body; a filter element mounted on said body in advance of said fuel outlet to prevent the access of unfiltered fuel thereto; a magnetic element surrounding said bolt and positioned in a central zone of said bowl, said magnetic element having a substantially flat horizontal surface; and means for introducing fuel from said fuel inlet passage into said central zone, said last-mentioned means including a passageway in said bolt communicating with said fuel inlet and also including at least one orifice in the side wall of said bolt communicating with said passageway, said orifice being positioned to direct fuel flow from said passageway radially across said flat surface of said magnet in relatively close proximity thereto.

2. The device of claim 1 wherein said magnetic element is supported above the bottom of said bowl on support members formed integrally with said bowl.

References Cited in the file of this patent

UNITED STATES PATENTS 2,437,221   Cox et al. _____ Mar. 2, 1948

FOREIGN PATENTS 195,200   Great Britain _____ Mar. 29, 1923